E. F. OSBORNE.
TESTAMETER.
No. 180,625.  Patented Aug. 1, 1876.
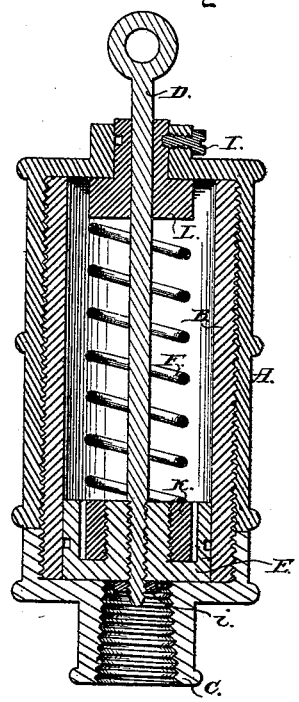
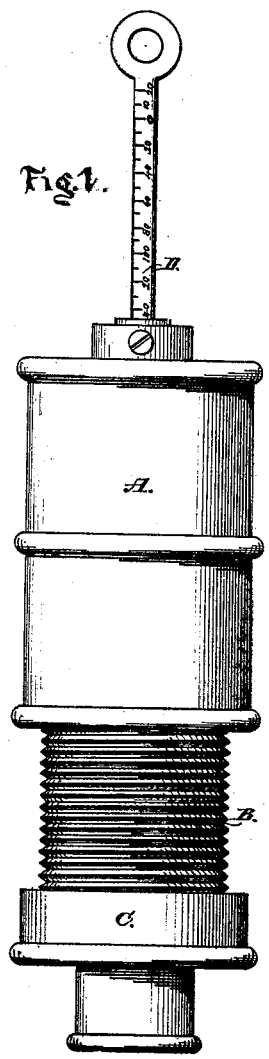

UNITED STATES PATENT OFFICE.

EUGENE FLORENCE OSBORNE, OF ST. PAUL, MINNESOTA.

IMPROVEMENT IN TESTAMETERS.

Specification forming part of Letters Patent No. 180,625, dated August 1, 1876; application filed July 8, 1876.

*To all whom it may concern:*

Be it known that I, EUGENE FLORENCE OSBORNE, of St. Paul, in the county of Ramsey and State of Minnesota, have invented certain Improvements in Instruments for Testing Steam-Pressure and Vacuum Gages, of which the following is a specification:

The object of my invention is to furnish an accurate, reliable, and durable instrument, capable of being carried in the pocket, that will take the place of the cumbersome and expensive "test-pump and gage" now made and used for that purpose.

In the common mode of testing gages, the gage to be tested is simply compared with another gage, and, as a rule, the only difference between the two gages is supposed to be right; but the party who is testing the gage has no means at his disposal to decide whether the test-gage is right or wrong.

The mode of construction and manner of using my invention are fully set forth in the following specification, reference being had to the accompanying drawings.

My invention, which I call a "pressure-gage testameter," is composed of metal, and, referring to the drawings—

Figure 1 represents an elevation of my invention, and Fig. 2 a sectional view of the same.

The letter A represents an outer case, which has a screw-thread cut upon its inner surface, and also an annular projection from the otherwise closed end. B represents an inner cylinder, which is bored out to such a diameter that the hole has some known area—one square inch is the area most convenient. Said cylinder has upon its exterior surface a screw-thread, which thread meshes with the thread above referred to, in the outer case A. The cylinder-head C of the outer cylinder has a screw-thread cut upon the inner surface of the larger end, which thread meshes with the thread upon one end of the cylinder B. There is also a thread on the opposite end, for the purpose of connecting the instrument to a gage. The piston E is made to closely fit to the cylinder B. Said piston is made hollow, with a nipple projecting from the bottom, which nipple has a screw-thread upon both its exterior and interior surfaces, the thread on the exterior being used to connect the spiral spring F to the piston E, and the thread on the interior being used to receive the piston-rod D.

The spiral spring F is so made and tempered as to exert a known tension when either compressed or extended by a known pressure, one inch motion of piston per one hundred pounds pressure on the spring being the most convenient. The spring F is connected at its ends to the metallic pieces $l$ and $k$, as shown. The piece L projects up through the top of the outer case A, and is held in place by a small screw, $i$, which screw projects through the top of case A into an annular groove in the piece L. The piston-rod D has upon its outer end a ring, the purpose of which will be hereinafter explained, and also a graduated scale, which graduations are made with reference to the area of the cylinder B, and the tension of the spiral spring F. The said piston-rod D is attached to the piston E by means of the thread above referred to upon the interior of the nipple that projects from the piston E.

The mode of using the above-described instrument is as follows: The cylinder-head C is firmly screwed onto the cylinder B. The spiral spring F, together with the two pieces $k$ and $l$, are then firmly screwed to the piston E; the spiral spring F, pieces $k$ and $l$, and piston E are then secured to the case A by means of the screw $i$, and the annular groove in the piece L. The piston-rod D is then screwed into the piston E until the part marked O on the said rod comes even with the outer end of the piece L. The case A is then screwed upon the cylinder B, into which cylinder the piston and spiral spring set.

When required for the purpose of testing, the casing A is screwed nearly off the cylinder B, as indicated in Fig. 1 of the drawings. Now, by filling the cylinder B, through the opening in the head C, the instrument being inverted for the purpose, with some thick fluid, like oil, and attaching the instrument to a pressure-gage by means of the screw-thread in the small end of the cylinder-head C, the instrument is ready to test the gage. Now, by screwing upon the case A a pressure is exerted upon the liquid in the cylinder B, by means of the piston E and spiral spring F, which pressure is transmitted to the gage to be tested, and, by noting the reading on the gage-dial, and also on the piston-rod D, any variation can be readily detected.

It is obvious from the above that a vacuum-gage is just as readily tested as a pressure-gage. The liquid is left out of the cylinder B, and the piston E is forced out instead of being forced in. The reading is, of course, upon the opposite side of the part marked O upon the piston-rod D.

In order at any time to test the accuracy of this instrument, it is only necessary to suspend it by one end and attaching a number of weights at the other end.

Having thus described my invention, what I claim, and desire to secure by Letters Patent, is—

1. The case A, having a screw-thread upon its inner surface, provided with a piston and graduated piston-rod, in combination with the cylinder B, having a screw-thread upon its exterior surface, substantially as described.

2. The graduated piston-rod D and piston E, in combination with the inner and outer cylinders, the whole arranged to operate as described.

3. The cylinder-head C, in combination with the inner and outer cylinders and pistons and graduated piston-rods, substantially as described.

EUGENE FLORENCE OSBORNE.

In presence of—
  LOUIS E. HAUSER,
  WM. S. MOORE.